Dec. 17, 1946.                     T. C. SHARP                         2,412,656
                              ELECTRIC MOTOR SYSTEM
                              Filed April 8, 1943                  2 Sheets-Sheet 1
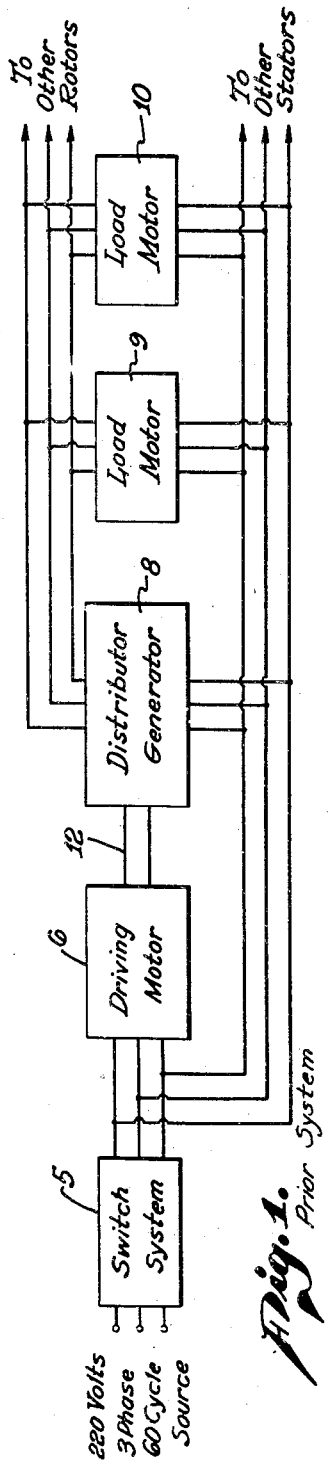
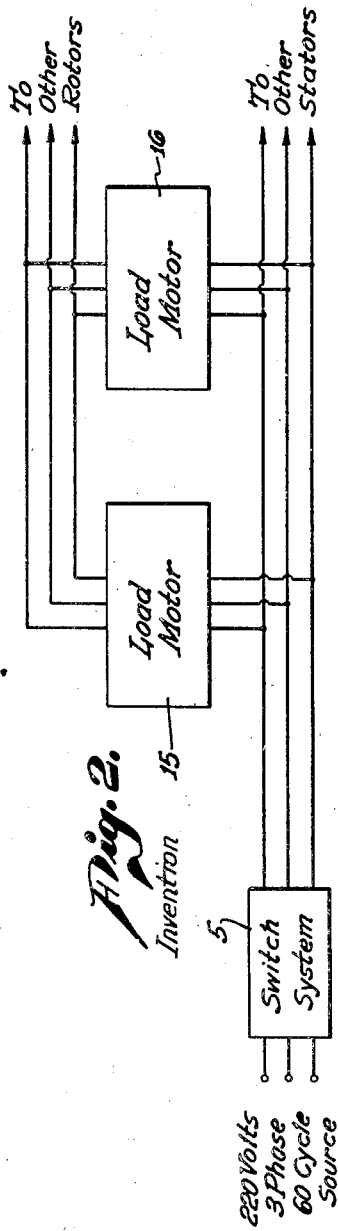
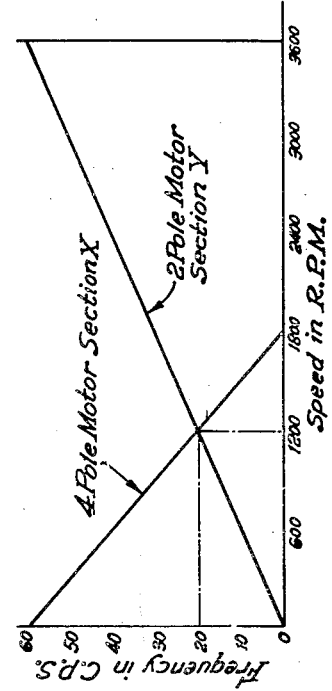
THOMAS C. SHARP,
INVENTOR.
BY
ATTORNEY.

Dec. 17, 1946.  T. C. SHARP  2,412,656
ELECTRIC MOTOR SYSTEM
Filed April 8, 1943  2 Sheets-Sheet 2

THOMAS C. SHARP,
INVENTOR.

BY

ATTORNEY.

Patented Dec. 17, 1946

2,412,656

UNITED STATES PATENT OFFICE 2,412,656

ELECTRIC MOTOR SYSTEM

Thomas C. Sharp, North Hollywood, Calif., assignor to Radio Corporation of America, a corporation of Delaware Application April 8, 1943, Serial No. 482,226

10 Claims. (Cl. 172—274)

This invention relates to electric motor systems and particularly to the interconnecting circuits and the speed control of alternating current interlock and synchronous motor systems which can be operated at a plurality of different speeds.

In certain motor drive systems, such as those used for advancing film in motion picture cameras, projectors, sound recorders, and sound reproducers, the motors are required to drive certain rotating elements, such as sprockets and shutters, not only at a constant speed, but in a predetermined phase relationship from a standstill position. In the case of a picture camera located at a scene being photographed, and a sound recorder located in a truck or in a building removed from the scene being photographed, it is necessary to advance the negative films, in the respective camera and recorder, at a constant speed so that the picture and sound can be later combined on one print. For this purpose ordinary synchronous motors may be used, such as the salient pole induction type, which have an initial starting torque, or they may be driven by alternating current interlock motors from a master distributor-generator which controls the rotation of the load motors.

With straight synchronous motors, the films are marked, when the motors reach constant speed, in order to facilitate the combination of the films. In recording systems using the interlock type of motors, the films may be marked at standstill for later combination of the sound track and picture. In process photography, wherein each frame must be projected during the time the photographing camera shutter is open, the alternating current interlock system is practically a necessity in order to accomplish these results, since the film pull-down mechanisms must be adjusted at standstill. There are also times in the production of sound motion pictures, particularly during the photographing of miniatures, when the film is advanced at other than the standard speed which is called "under-cranking" and "over-cranking."

The present invention is directed to a motor system which will provide a plurality of different speeds and will permit each motor to operate as a straight synchronous motor, or all motors to operate as in the present type of interlock system. The present system eliminates the comparatively expensive and bulky distributor-generator of the interlock systems, the motors have good starting characteristics without using auxiliary starting apparatus, while each motor may operate with a unity power factor which adds to the economy of such systems.

The principal object of the invention, therefore, is to facilitate the operation of a plurality of motors in synchronism.

Another object of the invention is to facilitate the operation of a plurality of motors in electrical interlock.

A further object of the invention is to provide an alternating current interlock motor system which does not employ a distributor-generator, and any motor of which may operate as a straight synchronous motor.

A further object of the invention is to provide a plural motor system adapted to operate either as an alternating current interlock system or as a straight synchronous system at different speeds.

A further object of the invention is to provide a motor system which is adaptable for variable speed operation or may be used as a straight synchronous or alternating current interlock system.

A further object of the invention is to provide a single motor unit which will operate at different synchronous speeds and at variable speeds.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a block diagram of the usual type of alternating current interlock system now in use.

Fig. 2 is a similar type of block diagram of a system embodying the invention.

Fig. 5 is a graph illustrating the speed of operation of the system of Fig. 2.

Figure 3:
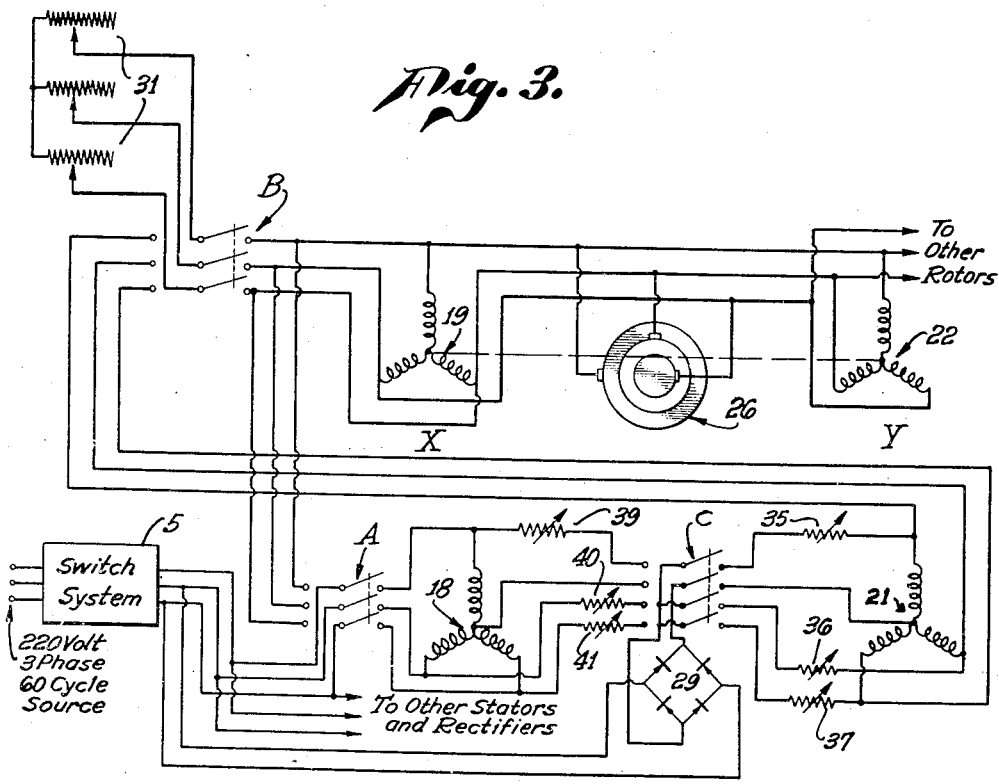
Fig. 3 is a schematic diagram of the switch system and of one of the motor units of Fig. 2.

Referring now to Fig. 1, the usual type of alternating current interlock system is shown supplied from a 220-volt, 3-phase, 60-cycle source connected through any well-known type of starting switch system 5 to a driving motor 6 and the stator of a distributor-generator 8 and the stators of the load motors of the system, two of such motors being shown at 9 and 10. The driving motor 6 is mechanically connected by a shaft 12 to the rotor of the distributor-generator 8.

The rotors of the load motors, and the rotor of the distributor-generator 8 are electrically interconnected as shown.

In operating a system such as shown in Fig. 1, the stators are first all energized simultaneously, which electrically and physically positions the rotors at standstill; the driving motor 6 is then energized and the rotation of the distributor rotor caused thereby will rotate the rotors of the load motors in exact phase relationship with the rotation of the rotor of the distributor-generator. When such a system is energized from a 60-cycle source, the interlock or slip frequency is 60 cycles when the rotors are stationary, and, as the rotors increase in speed, this frequency will decrease until it reaches some value, such as 20 cycles, where the driving motor reaches constant speed. The slip frequency is not reduced beyond 20 cycles because of the loss in locking in torque. In order to compensate for different resistance values in the rotors of the various motors, which are connected in the system and thus insure stability, it is necessary to have the master distributor-generator of a considerably larger capacity than that of the motors, which, together with the large synchronous driving motor comprises the major cost item of such a system. Furthermore, such a system is confined to a single interlock speed with a given power source. The interlocking action of self-synchronizing systems is well-known as disclosed in Michalke Patent No. 684,579 of October 15, 1901, Morton Patent No. 1,847,191 of March 1, 1932, Koenekamp Patent No. 2,004,992 of June 18, 1935, and Arndt Patent No. 2,310,339 of February 9, 1943.

As a comparison with the majority of interlock systems now in use, Fig. 2 shows the system of the invention in a manner similar to the showing of the system of Fig. 1. In Fig. 2, the same 220-volt, 3-phase, 60-cycle source is connected through the same starting switch system 5 of Fig. 1 to the stators of the load motors 15 and 16 of applicant's invention. The rotors of the load motors are interconnected similarly to the load motors of Fig. 1, but the driving motor 6 and the distributor-generator 8 of Fig. 1 have now been eliminated. The system of Fig. 2 will function in the same interlock manner as that of Fig. 1, and, in addition, by switching connections to each unit, each motor may operate as a straight synchronous motor at different speeds, as will now be explained.

Figure 4:
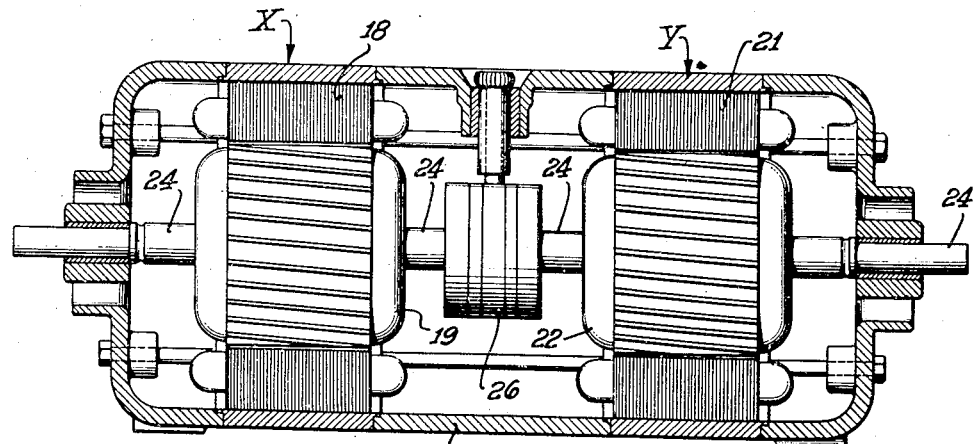
Fig. 4 is a cross sectional view of one of the motor units of Fig. 2.

Referring to Figs. 3 and 4, wherein one of the load motor units is represented both schematically and mechanically, all motors being similar, each motor unit comprises two sections which, for purposes of explanation, will be identified as section X and section Y. Section X is a four-pole wound rotor section having a stator 18 and a rotor 19, while section Y is a similar type two-pole section having a stator 21 and a rotor 22. Rotors 19 and 22 are on a shaft 24 mounted in bearings at the ends of the frame housing 27. A three-ring commutator 26 for the rotor windings is mounted on shaft 24 intermediate the rotors 19 and 22.

Referring now to Fig. 3, it will be noted that the rotors 19 and 22 are electrically connected together through the three slip rings of the commutator 26. It also is to be noted that stators 18 and 21 are tapped for the purpose of supplying a direct current thereto from a full wave rectifier 29 connected to one phase of the three-phase source of supply. For obtaining different speeds a triple section rheostat 31 and switches A, B, and C are provided, the functions of which will now be explained. Although only one motor unit such as 15 in Fig. 2, is illustrated in Figs. 3 and 4, it is to be understood that the other motors are of the same type, the stators and rotors of which are connected to the extension conductors indicated in Fig. 3, while the rectifier conductors may be similarly connected to respective rectifier units of other load motors.

The operation of the system will now be described, the first type of operation being that of an alternating current interlock system adapted to rotate at 1200 R. P. M. or, if only one motor is needed, then as a straight synchronous motor at 1200 R. P. M., this speed being the most generally used with present type of motion picture apparatus using interlock motors. To obtain this condition, switches A, B, and C are operated as follows:

1. Close switch A to the right.
2. Open switch B.
3. Close switch C to the right.

The closing of switch A to the right connects the 220-volt, 3-phase, 60-cycle source to the stator 18 of section X. The closing of switch C to the right connects the output of rectifier 29 to stator 21 through variable resistors 35, 36, and 37. With the switches so adjusted so that power is applied through the starting switch 5, 60-cycle current is induced by transformer action into rotor 19 and also into rotor 22, while the rotors are stationary. Since all motor sections and motor units are connected to the same power source, all windings are phased out, but with direct current in each winding 21 of the various units and these windings interconnected through resistors 35, 36, and 37, a starting torque is produced in rotors 22 and 19. As the rotors 19 and 22 begin to rotate due to this starting torque, which is also present in the other motor units, all rotors will remain in step due to the circulatory currents therebetween in the same manner as in the system of Fig. 1. For this type of operation, the resistors 35, 36, and 37 may be set at some fixed value, and, in the event the load on the motor is light, they may be omitted entirely. All motor units thus accelerate in phase and at the same rate until they reach a speed of 1200 R. P. M.

To explain the constant speed operation, reference is again made to the unit of Fig. 3 since all others function identically. First, the four-pole motor section X would normally accelerate to a speed of 1800 R. P. M., as shown by its speed characteristic in Fig. 5. The two-pole section Y, however, would normally accelerate to 3600 R. P. M. if the frequency on its rotor remains at 60 cycles. But, as the rotors 19 and 22 increase in speed, the frequency of the current in their windings will decrease, thus decreasing the speed of operation of the two-pole section Y. Thus, the rotors will continue to accelerate until the frequency of the current induced in rotors 19 and 22 is 20 cycles, at which point the synchronous speed of the two-pole driving section Y is 1200 R. P. M. (See Fig. 5.) Any further decrease in the frequency of the induced current will tend to increase the speed of section X and decrease the speed of section Y so the rotors remain at 1200 R. P. M. As the frequency supplied to all motor units in the system, shown in Fig. 2, is the same, their rotors will rotate in step or in phase with each other before and after they reach the speed of 1200 R. P. M. Since the stator of motor section Y is energized with direct current and is operating as a true synchronous motor, it may have a unity power factor and correct for any inductive load on the system. Thus, the above type of operation will produce a constant speed rotation of 1200 R. P. M., either interlock, which eliminates the distributor-generator and driving motor, or as a straight synchronous motor, if any one motor is operated alone.

The next type of operation to be described is where a single motor or a plurality of the motors are to be run as synchronous motors at 1800 R. P. M. To obtain this speed, the switches are thrown as follows:
1. Close switch A to the left.
2. Open switch B.
3. Close switch C to the left.

With the switches so adjusted, the power source is connected directly to the rotor windings 19 and 22, and the rectifier is connected to the stator winding 18 through the variable resistors 39, 40, and 41. The speed of the unit will now be controlled by the section X, and, as shown by the four-pole section characteristic in Fig. 5, the unit will run at 1800 R. P. M. with a squirrel cage starting action. The resistors 39, 40, and 41 may be set at some fixed value or may be used to provide the desired acceleration characteristic. With direct current in the stator windings, a desirable power factor is obtained.

To operate the unit at 3600 R. P. M. synchronous speed, the switches are operated as follows:
1. Close switch A to the left.
2. Open switch B.
3. Close switch C to the right.

With the switches so operated, the power source is again connected to the rotors 19 and 22, but the rectifier is now connected to the stator windings 21 through variable resistors 35, 36, and 37. In this manner of operation, the two-pole motor section Y controls the speed of the unit which will now run at 3600 R. P. M. synchronous speed, as shown by the speed characteristic of section Y in Fig. 5. The resistances 35, 36, and 37 may be set at a predetermined value or may be adjusted during acceleration to provide a desired starting rate.

The fourth type of operation of the system is as a variable speed motor from zero up to approximately 1800 R. P. M. This is accomplished by the following switch operations:
1. Close switch A to the right.
2. Close switch B to the right.
3. Open switch C.
4. Adjust rheostat 31 to speed desired.

With the switches so adjusted and with power applied through switch system 5, the four-pole motor section will operate as a squirrel cage motor at a speed dependent upon the amount of resistance across the rotor windings, such speed control being well-known in motion picture practice for making under and over-cranked shots.

A second type of variable speed operation covering a range of speeds from 1800 R. P. M. to approximately 3600 R. P. M. is obtained by the following switch adjustments:
1. Close switch A to the left.
2. Close switch B to the left.
3. Open switch C.
4. Adjust rheostat 31 to the speed desired.

With the switches in the position just indicated, the two-pole motor section Y will now operate as a squirrel cage induction motor, the speed of which may be a slip-synchronous speed from zero to approximately 3600 R. P. M., in accordance with the amount of resistance across the windings 21. Although the speed of the unit so connected may be brought below 1800 R. P. M., the power derived at these lower speeds is small so that it is preferable to use the four-pole motor section for these lower speeds.

From the above description, it will be noted that the invention utilizes a motor unit having a four-pole motor section and a two-pole motor section, the sections being concatenated in a manner to provide a synchronous speed of 1200 R. P. M., and operated individually to obtain synchronous speeds of 1800 R. P. M., and 3600 R. P. M. A plurality of these units may also be connected for interlock operation without the addition of a distributor-generator and driving motor, while a plurality of units may be connected to operate at the various synchronous speeds just mentioned. If no starting switch systems, such as shown at 5, were provided, a similar starting characteristic is obtainable by using the rheostat 31 across the winding 21, or by varying the resistances 35, 36, and 37 during the acceleration period. By the use of direct current on the stator windings, a unity power factor may be obtained to offset any inductive load on the power system. Although the cost of one motor unit of the invention may be greater than that of a load motor shown in Fig. 1, the cost of a normal complete system is less than a complete system of the type shown in Fig. 1, while the flexibility and economy of operation of the invention is considerably greater, as described above.

It is to be understood that although the invention has been illustrated and described in connection with a four-pole section and a two-pole section, other combinations may be concatenated to obtain other interlock speeds. That is, a four-pole four-pole unit will operate at 900 R. P. M. while a six-pole four-pole unit will run at 720 R. P. M. if energized from a 60-cycle source.

I claim as my invention:
1. A motor system comprising a source of alternating current energy, a source of direct current energy, a plurality of motor units each having a pair of stators and a pair of rotors, all of said rotors of all of said units being electrically interconnected, said rotors of each of said units being mechanically and electrically interconnected, one of said stators and one of said rotors of each of said units forming a motor section and the other of said stators and rotors of each of said units forming a second motor section, said first mentioned section having a predetermined maximum speed as an individual section and said second section having a different maximum speed as an individual section, the final constant speed of operation of each of said units being at the intersection of the speed characteristics of said two sections, said operating speed being less than said first mentioned maximum speeds, and a plurality of switching means between said source of alternating current energy and the stators of said first mentioned section of each of said units and the rotors of each of said units, and between said direct current energy source and said stators, one position of said switching means connecting said source of alternating current energy to the stator of said first mentioned section of each of said units, and connecting said source of direct current energy to the stator of said second section of each of said units, said units being adapted to be magnetically locked, accelerated, and run in step at a synchronous speed determined by the number of poles of said motor sections.

2. A motor system in accordance with claim 1, in which another position of said switching means connects said alternating current source to the rotors of said sections of each of said units for operating each of said units at said first mentioned maximum speed of said first mentioned section when the stator of said first mentioned section of each of said units is connected to said source of direct current by said switching means.

3. A motor system in accordance with claim 1, in which a third position of said switching means connects said alternating current source to the rotors of said sections of each of said units for operating each of said units at said second mentioned maximum speed of said second mentioned section when the stator of said second mentioned section of each of said units is connected to said source of direct current by said switching means.

4. A plural motor system comprising a plurality of motor units, each unit having a pair of rotors electrically and mechanically interconnected and a pair of stators, means for electrically interconnecting all of said rotors of all of said units, a source of three-phase electrical current, means for obtaining direct current from said source, a plurality of switching means adapted to connect said direct current means to one or the other of said stators of all of said units, and a plurality of switching means adapted to connect said alternating current source to one stator of said pair of stators or to said rotors of said units, the relative positioning of said switching means controlling the interlock speed of operation of said units.

5. A plural motor system comprising a plurality of motor units, each unit having a pair of rotors electrically and mechanically interconnected and a pair of stators, means for electrically interconnecting all of said rotors of all of said units, a source of three-phase electrical current, means for obtaining direct current from said source, switching means adapted to connect said direct current means to one or the other of said stators of all of said units, and switching means adapted to connect said alternating current source to one stator of said pair of stators or to said rotors of said units, said motor units operating at a certain constant speed in interlock when said alternating current is connected to said one stator of each of said units and said direct current means is connected to said other stator of each of said units, any one of said motor units being adapted to operate at a synchronous speed different from said first mentioned speed when said alternating current energy source is connected to said rotors of said units and said direct current means is connected to one of said stators, and at a third synchronous speed when said alternating current source is connected to said rotors and said direct current means is connected to the other of said stators.

6. A plural motor system comprising a plurality of motor units, each unit having a pair of rotors electrically and mechanically interconnected and a pair of stators, means for electrically interconnecting all of said rotors of all of said units, a source of three-phase electrical current, means for obtaining direct current from said source, switching means adapted to connect said direct current means to one or the other of said stators of all of said units, and switching means adapted to connect said alternating current source to one stator of said pair of stators or to said rotors of said units, said motor units operating at a certain constant speed in interlock when said alternating current is connected to said one stator of each of said units and said direct current means is connected to said other stator of each of said units, any one of said motor units being adapted to run at a plurality of different speeds when said alternating current source is connected to a stator of said unit and the rotors of said unit are connected to a variable resistance.

7. A plural motor system comprising a source of three-phase alternating current, a source of direct current, a plurality of motor units, each unit having a pair of stators and a pair of rotors, means for electrically interconnecting all of said rotors of all the units, means for mechanically connecting the two rotors of each of said units, a plurality of switching means interposed between said alternating current source, one of the stators of each unit, and the rotors of each unit, and another plurality of switching means interposed between said direct current source and the stators of all of said units, the connecting of said alternating current source to one stator of each unit, and the connecting of said direct current source to another stator of each unit providing all of said motor units with a certain constant interlock speed, the connecting of said alternating current source to all of said rotors and the connecting of said direct current source to one of said stators providing a different interlock speed of operation of all of said units, and the connecting of said alternating current source to said rotors and the connecting of said direct current source to the other of the stators of said units providing a third speed of interlock operation of all of said units.

8. A plural motor system in accordance with claim 7, in which any one of said units may be operated at a variable speed when one stator thereof is connected to said alternating current source and a variable resistance is connected to the rotors of said unit.

9. The method of operating a plurality of motor units at a plurality of different speeds in interlock, each of said units including a pair of stators and a pair of rotors, said rotors of each unit being mechanically and electrically connected, said method comprising simultaneously energizing one of the stators of each of said units with alternating current, and simultaneously energizing all the other stators of said units with direct current to provide a certain speed of interlock operation; simultaneously energizing all of the rotors of all of said units with alternating current, and simultaneously energizing one stator of all of said units with direct current to obtain a second interlock speed of operation; and simultaneously energizing all of the rotors of said units with alternating current and simultaneously energizing the other stator of all of said units with direct current to obtain a third interlock speed of operation.

10. The method in accordance with claim 9, in which any one of said motor units may be operated at a variable speed by impressing alternating current on a stator of said unit and connecting a variable resistance to the rotors of said unit.

THOMAS C. SHARP.